(No Model.)
A. L. HORNER.
DREDGER SLEEVE.
No. 562,963. Patented June 30, 1896.
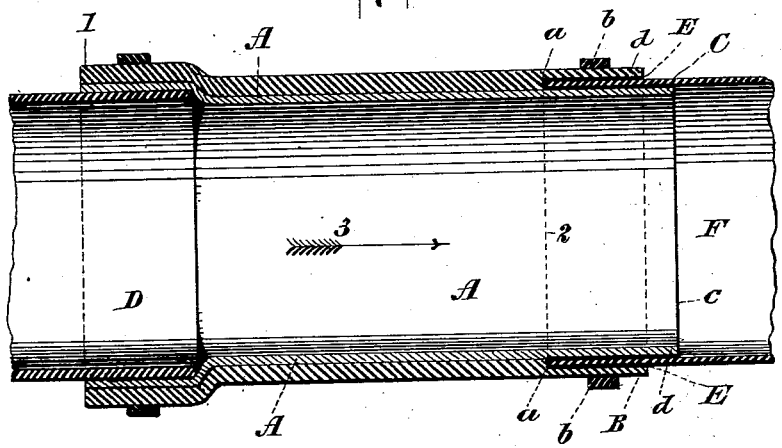
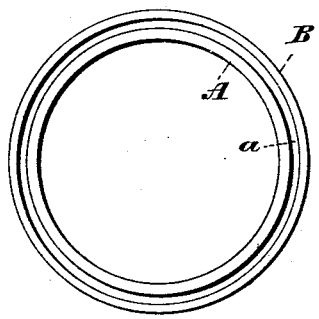
WITNESSES:
INVENTOR
Andrew Long Horner
BY Briesen & Knauth
ATTORNEYS.

UNITED STATES PATENT OFFICE.

ANDREW LONG HORNER, OF SEATTLE, WASHINGTON, ASSIGNOR TO THE GUTTA PERCHA AND RUBBER MANUFACTURING COMPANY, OF NEW YORK, N. Y.

DREDGER-SLEEVE.

SPECIFICATION forming part of Letters Patent No. 562,963, dated June 30, 1896.

Application filed February 20, 1896. Serial No. 579,934. (No model.)

*To all whom it may concern:*

Be it known that I, ANDREW LONG HORNER, a resident of Seattle, King county, Washington, have invented certain new and useful Improvements in Dredger-Sleeves, of which the following is a specification.

My invention relates to dredger-sleeves, and has for its object to produce dredger-sleeves for use in coupling adjacent hydraulic dredger-pipes so that the passage of the excavated material through the joints will be greatly facilitated.

As is well known, dredgers ofttimes have to deliver the material they take up at some distance from where they are anchored, and frequently across an intervening space of water. Under these circumstances the dredger is connected with the place of deposit by series of sections of iron pipe, the ends of which are joined together by a section of flexible hose for the reason that the iron pipes being supported individually by small pontoons some flexible connection must intervene between the adjacent pipes, for if a rigid connection were used the joint would soon be broken owing to the tossing and pitching of the pontoons in the seaway. Heretofore these joints have been constructed in two fashions. By the first fashion or method the ends of the adjacent iron pipes were slipped into the opposite ends of a rubber sleeve, the portions of the sleeves which lapped over the ends of the pipes being clamped firmly by clamps, or else, as in the second fashion, the internal diameter of the connecting-sleeves was increased at or near the ends to about the external diameter of the iron pipes which were inserted into them. Both of these joints are, however, defective and give rise to serious difficulties for the reason that the shoulder formed in each joint by the end of the pipe nearest to the dredger, that is to say, the receiving end of each pipe-section, would offer a point of resistance to the material passing through the joint, and as the force of the flow of material is quite powerful, after a little time the material would work its way between the outside of the pipe and the inside of the hose and force the hose off where it would be fastened by the band. When this occurs, it is necessary to suspend operations to clean out and repair the break. Again, little sticks and stones would be thrown up against this shoulder and the dirt would back up around it and the inside diameter of the hose would be sensibly reduced at this point, which in a little while would result in a more or less complete stoppage of the hose, resulting in a bulging of the sleeves, extra work thrown on the pumps, and a small output of material at the delivery end. Under these circumstances, the rubber couplings are very often forced off or an almost complete stoppage of operations caused, necessitating a shut-down while the places where the obstructions exist are located and cleaned out. All of these things constitute a serious drawback to the employment of the dredger-sleeves now in use. Now my invention is designed to obviate these and many other defects of the existing structures, by producing a sleeve which presents no shoulders or other obstructions to the flow of material therethrough.

I will now proceed to describe and claim my invention, having reference to the accompanying drawings, forming part hereof, in which—

Figure 1 is a section of a complete dredger conduit-pipe joint, showing the dredger-pipes joined by a sleeve embodying my invention. Fig. 2 is an end view of the sleeve, looking from the right.

In the drawings, A represents the body portion of the sleeve, which is shown as consisting of two elastic sleeves B and C, placed one within the other and vulcanized together from the end 1 to about the line 2. The inner sleeve C is more elastic than the outer sleeve B, the outer sleeve B being preferably made of stiffer material. The edge or lip $c$ of the sleeve C of the dredger-sleeve preferably extends beyond the edge or lip $d$ of the sleeve B, there being an annular space E between these sleeves, whose bottom is constituted by a shoulder $a$, formed in the sleeve B.

The manner of using this sleeve is clearly shown in Fig. 1, wherein the end D of a section of the dredger-pipe line is inserted in the left-hand end of the body portion A, the end of the adjacent pipe-section F being inserted into the annular space E between lips $d$ and $c$ of the sleeves B and C, the joint being preferably completed by clamping-rings $b\ b$.

The use of this sleeve is clearly shown in Fig. 1, wherein the direction of flow of the excavating material is indicated by the arrow 3; and having due regard to this fact it will be seen that the joint presents little or no obstruction to the passage of the fluid excavated.

What I claim, and desire to secure by Letters Patent, is—

1. As a new and useful article of manufacture, the herein-described dredger sleeve or coupling consisting of sleeves B and C of flexible material, one being surrounded by the other, and leaving between them at one end an intervening annular space E adapted for the reception of the end of a dredger-pipe.

2. As a new and useful article of manufacture, the herein-described dredger sleeve or coupling comprising a body portion A consisting of sleeves of flexible material such as rubber one within the other, leaving an annular space between the sleeves at one end thereof, one edge of the inner sleeve extending beyond the corresponding edge of the outer sleeve.

3. As a new and useful article of manufacture, the herein-described dredger-sleeve comprising the sleeves B and C one within the other, leaving an annular space between the said sleeves adapted for the reception of a dredger-pipe, the said outer sleeve being formed with a shoulder as A constituting the bottom of the annular space.

4. As a new and useful article of manufacture, the herein-described dredger-sleeve comprising two flexible tubes or sleeves B and C one contained within the other and vulcanized together, except for a portion of their length where an annular space is left between the tubes for the reception of the pipe.

5. As a new and useful article of manufacture, the herein-described dredger-sleeve comprising two flexible tubes or sleeves B and C one contained within the other and vulcanized together, except for a portion of their length where an annular space is left between the tubes for the reception of the pipe, the said inner sleeve being more flexible than the outer sleeve.

6. As a new and useful article of manufacture, the herein-described dredger-sleeve comprising two flexible tubes or sleeves B and C one contained within the other and vulcanized together, except for a portion of their length where an annular space is left between the tubes for the reception of the pipe, one edge of the said inner sleeve projecting beyond the corresponding edge of the said outer sleeve.

7. As a new and useful article of manufacture, the herein-described dredger-sleeve comprising two flexible tubes or sleeves B and C one contained within the other and vulcanized together, except for a portion of their length where an annular space is left between the tubes for the reception of the pipe, the said inner sleeve being more flexible than the outer sleeve, one edge of the said inner sleeve projecting beyond the corresponding edge of the said outer sleeve.

8. As a new and useful article of manufacture, the herein-described dredger-sleeve consisting of an inner sleeve C of flexible material and an outer sleeve B of less flexible material, the said sleeves being vulcanized together for a portion of their lengths, leaving an annular space at one end of the joined sleeve, the sleeve B being formed with the shoulder A constituting the bottom of this annular space, the end of the sleeve C which is adjacent to the annular space extending beyond the edge of the corresponding end of the sleeve B, substantially as described.

9. The herein described and shown dredger sleeve or coupling comprising a sleeve or body A of flexible material terminating in two lips $c\ d$ of flexible material, one of the said lips surrounding the other so as to form between them an annular recess E for the reception of a pipe.

ANDREW LONG HORNER.

Witnesses:
N. C. RICHARDS,
W. L. READ.